United States Patent
Lazarenka et al.

(10) Patent No.: US 11,091,146 B2
(45) Date of Patent: Aug. 17, 2021

(54) METHOD FOR PERFORMING SHIFTS IN A DOG CLUTCH ELEMENT

(71) Applicant: VOITH PATENT GMBH, Heidenheim (DE)

(72) Inventors: Vitali Lazarenka, Aalen (DE); Jochen Lindenmaier, Herbrechtingen (DE); Bernd Gross, Heidenheim (DE); Johannes Goette, Giengen (DE)

(73) Assignee: Voith Patent GmbH, Heidenheim (DE)

( * ) Notice: Subject to any disclaimer, the term of this patent is extended or adjusted under 35 U.S.C. 154(b) by 138 days.

(21) Appl. No.: 16/335,348

(22) PCT Filed: Sep. 15, 2017

(86) PCT No.: PCT/EP2017/073269
§ 371 (c)(1),
(2) Date: Mar. 21, 2019

(87) PCT Pub. No.: WO2018/054773
PCT Pub. Date: Mar. 29, 2018

(65) Prior Publication Data
US 2019/0276005 A1  Sep. 12, 2019

(30) Foreign Application Priority Data

Sep. 21, 2016 (DE) .................... 10 2016 218 115.7

(51) Int. Cl.
*B60W 10/08* (2006.01)
*F16H 47/08* (2006.01)
(Continued)

(52) U.S. Cl.
CPC ............. *B60W 20/15* (2016.01); *B60K 6/387* (2013.01); *B60K 6/547* (2013.01); *B60W 10/06* (2013.01);
(Continued)

(58) Field of Classification Search
CPC . B60W 2710/1038; B60W 2710/1011; B60W 2510/0638; B60W 2510/1015;
(Continued)

(56) References Cited

U.S. PATENT DOCUMENTS 8,491,433 B2   7/2013  Busch
9,394,973 B1 *  7/2016  Theobald ............ F16H 61/0403
(Continued)

FOREIGN PATENT DOCUMENTS

DE      19901414 A1    7/2000
DE   102006019239 A1   10/2007
(Continued)

*Primary Examiner* — Ernesto A Suarez
*Assistant Examiner* — Lillian T Nguyen
(74) *Attorney, Agent, or Firm* — Laurence A. Greenberg; Werner H. Stemer; Ralph E. Locher

(57) ABSTRACT

A method performs shifts in a dog clutch element of a transmission system in a hybrid vehicle. The vehicle has an input shaft being connected to a crankshaft of an internal combustion engine, an output shaft being connected indirectly to driven wheels, an electric machine which is in engagement with the input shaft, and an automatic transmission connected between the input and output shafts. The transmission has a dog clutch element for the releasable coupling of two transmission elements. During a desired shifting of the dog clutch element, the torque of the input shaft is adapted via the electric machine, and therefore a reduced load prevails in the region of the dog clutch element and the latter can be disengaged, after which the internal combustion engine is set to a desired target rotational speed, and after which the dog clutch element is engaged when the target rotational speed is reached.

9 Claims, 1 Drawing Sheet

(51) Int. Cl.

| | |
|---|---|
| *B60W 20/15* | (2016.01) |
| *B60W 10/06* | (2006.01) |
| *B60W 10/11* | (2012.01) |
| *B60W 30/19* | (2012.01) |
| *B60W 10/115* | (2012.01) |
| *B60W 10/111* | (2012.01) |
| *B60K 6/387* | (2007.10) |
| *B60K 6/547* | (2007.10) |
| *B60W 20/30* | (2016.01) |
| *F16H 59/66* | (2006.01) |
| *F16H 61/04* | (2006.01) |
| *B60K 6/48* | (2007.10) |

(52) U.S. Cl.
CPC ............ *B60W 10/08* (2013.01); *B60W 10/11* (2013.01); *B60W 10/111* (2013.01); *B60W 10/115* (2013.01); *B60W 20/30* (2013.01); *B60W 30/19* (2013.01); *F16H 47/085* (2013.01); *B60K 2006/4825* (2013.01); *B60W 2510/0638* (2013.01); *B60W 2510/104* (2013.01); *B60W 2510/1015* (2013.01); *B60W 2520/16* (2013.01); *B60W 2552/15* (2020.02); *B60W 2710/0644* (2013.01); *B60W 2710/081* (2013.01); *B60W 2710/083* (2013.01); *B60W 2710/1005* (2013.01); *B60W 2710/1011* (2013.01); *B60W 2710/1022* (2013.01); *B60W 2710/1038* (2013.01); *B60Y 2200/92* (2013.01); *B60Y 2400/421* (2013.01); *B60Y 2400/422* (2013.01); *B60Y 2400/433* (2013.01); *F16H 2059/663* (2013.01); *F16H 2061/0422* (2013.01); *F16H 2061/0474* (2013.01); *Y02T 10/62* (2013.01)

(58) Field of Classification Search
CPC ... B60W 2510/104; B60W 2710/0644; B60W 2710/081; B60W 2710/083; B60W 2710/1005; B60W 2710/1022; F16H 2061/0422; F16H 2061/0474
See application file for complete search history.

(56) References Cited

U.S. PATENT DOCUMENTS

| | | | |
|---|---|---|---|
| 10,000,115 B2 | 6/2018 | Ziemer et al. | |
| 2008/0125287 A1 | 5/2008 | Kakiuchi et al. | |
| 2012/0259494 A1* | 10/2012 | Schaeffer | B60W 20/40 701/22 |
| 2013/0199464 A1 | 8/2013 | Burr | |
| 2014/0046525 A1 | 2/2014 | Lee et al. | |
| 2015/0031502 A1* | 1/2015 | Kaltenbach | B60W 10/111 477/5 |
| 2015/0152960 A1* | 6/2015 | Haug | F16H 61/0403 477/86 |
| 2016/0001771 A1* | 1/2016 | Nakanishi | B60W 10/08 701/22 |
| 2016/0039418 A1* | 2/2016 | Wall | B60W 30/19 701/99 |
| 2018/0118216 A1* | 5/2018 | Toyota | B60W 10/08 |
| 2018/0154886 A1* | 6/2018 | Tsukizaki | B60W 10/11 |

FOREIGN PATENT DOCUMENTS

| | | |
|---|---|---|
| DE | 102008027946 A1 | 12/2009 |
| DE | 102010046048 A1 | 3/2012 |
| DE | 102012224506 A1 | 2/2014 |
| DE | 102014208873 A1 | 11/2015 |
| EP | 0492152 A1 | 7/1992 |
| WO | 2009149840 A1 | 12/2009 |
| WO | 2015076723 A1 | 5/2015 |

* cited by examiner

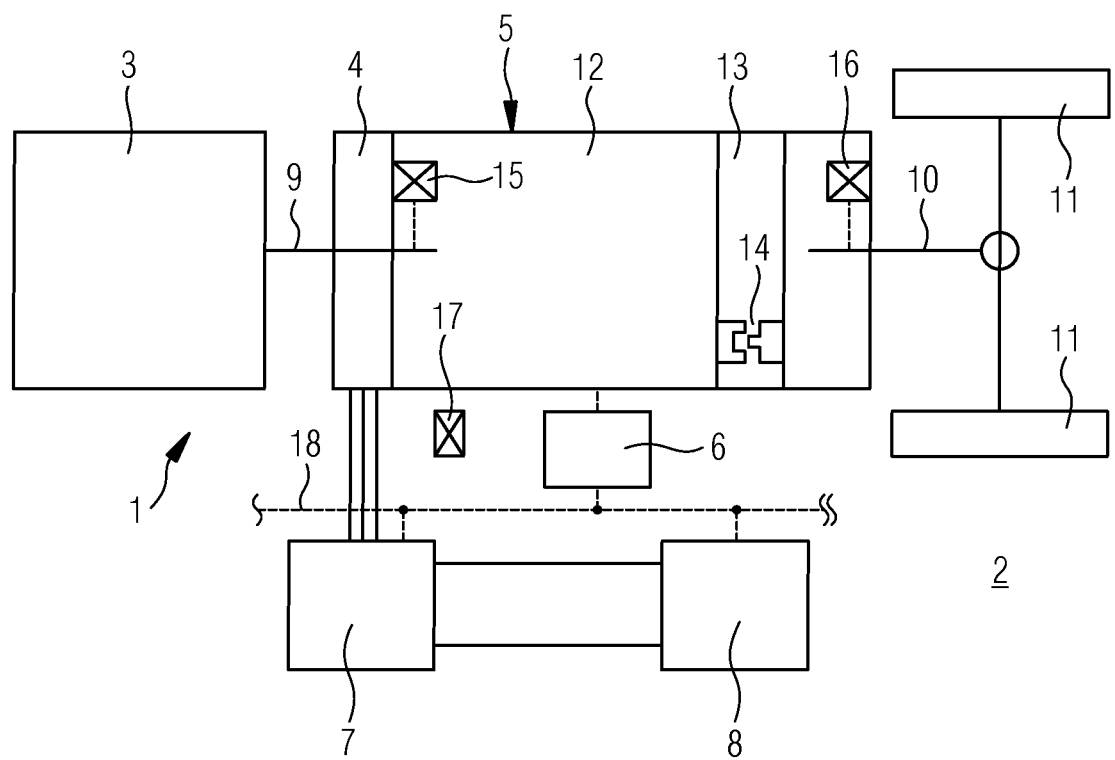

METHOD FOR PERFORMING SHIFTS IN A DOG CLUTCH ELEMENT

BACKGROUND OF THE INVENTION

Field of the Invention

The invention relates to a method for performing shifts in a dog clutch element of a transmission in a hybrid vehicle having the features in the preamble of the independent claim.

Hybrid vehicles are known to this extent from the general prior art. It is increasingly the case that the focus is on increased hybridization even in commercial vehicles. A customary design makes provision for an electric machine to be arranged, for example, on or in operative connection with the input shaft of a transmission between an internal combustion engine and the transmission.

Furthermore, it is known from the general prior art, and here in turn in particular from the sphere of commercial vehicle engineering, that transmissions are designed as automatic transmissions, and nevertheless have at least one dog clutch element. This can be in particular what is referred to as an overdrive, i.e. a rapid gear ratio which can typically be switched on starting from the highest gear ratio of the automatic transmission in order to provide a further gear ratio. This is disclosed, for example, in DE 10 2008 027 946A1. For example, an automatic transmission having four gear ratios can be used for shifting five gear ratios. A first problem with such shifting of dog clutch elements is the fact that the shifting is intended to be performed very rapidly, as is similarly also true in the case of automated shift transmissions, and the second problem is that the rotational speeds have to be adapted via mechanical synchronization devices in such a manner that the dog clutch elements intermesh and reliably perform shifting.

This challenge of reliable and convenient shifting of dog clutch elements, for example in an automatic transmission having at least one dog clutch element or else in automated shift transmissions, is typically solved by mechanical synchronization devices. The latter intermesh in a frictional manner before the dog clutch elements intermesh, in order thereby to adapt the rotational speeds. By design, frequent shifting in the case of such synchronization devices then leads to a comparatively large amount of wear and requires a comparatively long time depending on the difference in the rotational speeds which are present. During travel downhill or on the flat, this typically does not constitute any problem. During travel uphill, the comparatively long shifting times because of the necessary synchronization may absolutely be perceived to be disadvantageous and uncomfortable. In addition, the associated power loss is a further disadvantage of synchronization using friction. First of all, this increases the fuel consumption of the vehicle and, secondly, waste heat arises in the region of the synchronization devices and has to be cooled down together with the waste heat arising in the transmission, which further increases the demands on the cooling system. This likewise causes undesirable costs and an undesirable increased need for construction space.

SUMMARY OF THE INVENTION

It is an object of the present invention to specify a method for performing shifts in a dog clutch element in a transmission system in a hybrid vehicle that avoids the disadvantages mentioned.

According to the invention, this object is achieved by a method having the features in the independent claim. Advantageous refinements and developments emerge from the dependent claims which are dependent thereon.

The method according to the invention for performing shifts in a dog clutch element of a transmission system in a hybrid vehicle uses the customary design of a hybrid vehicle in which a crankshaft of an internal combustion engine of the hybrid vehicle is connected to an input shaft of the transmission system. An output shaft of the transmission system is connected at least indirectly to driven wheels of the hybrid vehicle. An electric machine is in engagement with the input shaft of the transmission system. An automatic transmission or an automated shift transmission is arranged between the input shaft and the output shaft. Part of said transmission is at least one dog clutch element for the releasable coupling of two transmission elements.

In the case of the method according to the invention in the event of a desired shifting of the dog clutch element the torque of the input shaft is adapted via the electric machine, specifically in such a manner that a reduced load prevails in the region of the dog clutch element and the latter can be disengaged. The load or the torque between the two dogs of the dog clutch element is therefore correspondingly reduced, according to a highly advantageous configuration and development of the invention, to zero. In this state with a reduced load or, according to the particularly advantageous development, without a load, the dog clutch element, which typically interacts with its counterelement via undercuts, can then easily be disengaged. The internal combustion engine is subsequently braked or accelerated to the desired target rotational speed via the electric machine. The electric machine of the hybrid drive interacts directly with the input shaft. The internal combustion engine can thus be acted upon via the electric machine either in a direct connection or optionally with the interconnection of a torsional vibration damper and/or a clutch. Depending on requirements, said internal combustion engine is braked, with the electric machine operating in the manner of a generator and the electrical energy which is liberated being temporarily stored in an energy accumulator device, or the internal combustion engine is correspondingly accelerated, for which purpose the electric machine is operated in a motor manner with energy from the energy accumulator device. As soon as the desired target rotational speed has been set, and the latter, according to a particularly advantageous development of the concept, is always related to the output shaft of the transmission, the dog clutch element is then engaged again. This can take place in particular precisely when the target rotational speed is reached, or preferably also shortly beforehand, i.e. at a rotational speed difference of a few percent, typically less than 10%. For this purpose, the dog clutch element can continue to have its mechanical synchronization device in order, firstly, to be able to perform shifts very rapidly, i.e. to be able to be engaged just shortly before the target rotational speed is reached, and in order, secondly, to compensate for small deviations in the rotational speeds. However, unlike in the prior art, said mechanical synchronization device is subjected to substantially less loading, and therefore less waste heat and less wear occur. In addition, the fuel consumption can be reduced in comparison to the prior art because of the smaller heat losses here.

The method according to the invention therefore uses the electric machine of the hybrid system in order to undertake an adaptation of the torques, and therefore indirectly also of the rotational speeds, in the desired manner. In practice, such a "braking mode" or "boost mode" for the internal combustion engine acts very much more rapidly via the electric machine than direct activation of the internal combustion engine permits. This is true in particular if the internal combustion engine is designed to be correspondingly difficult to control. Such internal combustion engines which can be difficult to control can now in particular be gas engines which, on account of the very much lower soot emissions and the lower emissions of nitrogen oxides therein, are increasingly used in city buses and delivery trucks within large metropolitan areas and towns. Gas engines especially are extremely complex in terms of activation and make a conventional method very difficult. It is specifically here that the method according to the invention affords the crucial advantage that, without serious intervention in the controller of the internal combustion engine, which is then in the form of a gas engine, the rotational speed can be increased or reduced via the electric machine.

According to a highly advantageous development of the method according to the invention, it is furthermore provided here that the shifting operation of the dog clutch element is controlled/regulated via at least one control unit, which is integrated in the transmission system, for the transmission and the electric machine. In particular within the transmission, the precise requirements for extremely efficient and rapid shifting by means of the dog clutch element are known. Instead of transferring these requirements in a complicated manner to outside the transmission system via a data bus, it is possible for the first time, with the method according to the invention, to satisfy these requirements directly in the transmission system, which comprises the electric machine and the transmission, by the internal combustion engine being acted upon by the transmission in the desired manner in order thereby to extremely efficiently and rapidly actuate the dog clutch elements.

Typically, all of the relevant information is present within the transmission system. According to an advantageous development of the method according to the invention, rotational speed sensors can be arranged here on the input shaft and on the output shaft and transmit their sensed rotational speeds to the control unit integrated in the transmission system. According to an advantageous development of the concept, similar can also take place by means of an inclination sensor which likewise transmits its data to the control unit integrated in the transmission system. The shifting operation can therefore be adapted to uphill or downhill travel. It is therefore altogether possible to generate all of the data for expedient, efficient and rapid shifting from the transmission system. On the basis of said information, then, according to the above-described advantageous development, again from the transmission system the torque and the rotational speed of the input shaft, and therefore ultimately of the internal combustion engine, can be adapted by the control unit integrated in the transmission system. Without having to have an influence on said internal combustion engine in terms of control technology, the ideal conditions for rapid and efficient shifting can thus be set by the transmission system itself.

Further advantageous refinements of the method according to the invention also emerge from the rest of the dependent claims and will be described in more detail below with reference to an exemplary embodiment.

BRIEF DESCRIPTION OF THE DRAWING

The sole attached FIGURE shows a vehicle arranged in principle or the drive train thereof in a variant with which the method according to the invention can be carried out.

DESCRIPTION OF THE INVENTION

In the illustration of the FIGURE, a drive train 1 of a vehicle 2, not illustrated in its entirety, can be seen in highly schematized form. The vehicle 2 is intended to be designed here as a hybrid vehicle, in particular as a commercial vehicle. The vehicle 2 can particularly preferably be a bus.

The drive train 1 of the hybrid vehicle 2 comprises an internal combustion engine 3 and an electric machine 4. The latter is part of a transmission system which, in addition to a transmission 5 and the electric machine 4, also has a control unit 6 and a frequency converter 7 for activating the electric machine 4, and an energy accumulator device 8, for example a battery or supercapacitors or a combination thereof. An input shaft 9 of the transmission system connects a crankshaft of the internal combustion engine 3 to the electric machine 4 and the transmission 5. An output shaft 10 of the transmission provides the drive of driven wheels 11 of the hybrid vehicle 2, which wheels are likewise indicated here. In the exemplary embodiment illustrated here, the transmission 5 is intended to be designed as an automatic transmission in the form of a differential converter transmission 12 which has what is referred to as an overdrive 13 connected downstream of said differential converter transmission 12. Depending on the engaged gear of the differential converter transmission 12, said overdrive 13 can be brought into at least two different shifting positions in order thereby once again to change the transmission ratio prevailing at the output shaft 10. Said shifting of the overdrive 13 typically takes place via dog clutch elements, wherein one such dog clutch element 14 with two dogs is indicated purely by way of example in the region of the overdrive 13.

In addition, the transmission system comprises a rotational speed sensor 15 which is connected to the input shaft 9, and a rotational speed sensor 16 which is connected to the output shaft 10. Furthermore, an inclination sensor 17 is installed in the transmission system. All of the sensors 15, 16, 17 supply data to the control unit 6 of the transmission system and assist said control unit in controlling or regulating the operations within the transmission 5.

The input shaft 9 is ideally connected here to the crankshaft of the internal combustion engine 3 via a torsional vibration damper. A shiftable clutch can likewise be provided in principle in the region between the input shaft 9 and the crankshaft. However, the design functions particularly simply and efficiently if a shiftable clutch is omitted in the region of the input shaft 9. The internal combustion engine 3 can be any desired internal combustion engine 3. The latter will frequently be designed as a diesel engine in the sphere of commercial vehicles. However, it can also be configured as a different type of internal combustion engine, for example as a gas engine. In respect of activation, in particular such gas engines are highly complex and substantially more difficult to precisely activate than, for example, these diesel engines are. The method below is suitable for both variants. In particular, however, an extremely simple, efficient and effective shifting of the dog clutch element 14 can be achieved even with the gas engine which can be difficult to activate.

If, via a data bus system 18, which can be designed in particular as a CAN bus, a shifting requirement now arrives at the control unit 6 of the transmission system, or is generated by the latter itself, then at this time loads typically prevail in the region of the dog clutch element 14, and therefore the latter cannot be simply disengaged, in particular since an inadvertent disengagement of the individual dogs is prevented by suitable undercuts in the normal situation. Starting from the control unit 6 of the transmission system, the electric machine 4 can now be activated via the frequency converter 7 in such a manner that the load in the region of the dog clutch element 4 is reduced and ideally becomes zero. For this purpose, the internal combustion engine 3 is braked via the electric machine 4, for example in the generator mode. Energy arising in the process migrates via the frequency converter 7 into the energy accumulator device 8. If an increase in the torque or the rotational speed of the internal combustion engine 3 is necessary in order to reduce the load, this can likewise take place via the electric machine 4, in this case then in motor mode. The electrical power necessary for this purpose originates in turn from the energy accumulator device 8.

The desired torque or the desired rotational speed of the input shaft 9 can therefore be set solely on the basis of the transmission system, and without having to intervene in the motor controller of the internal combustion engine 3. The transmission system therefore as it were creates its idealized conditions by engagement with the electric machine 4 on the input shaft 9 itself. The desired rotational speed can be monitored via the rotational speed sensor 15. In the ideal case, only a very small moment, or preferably no longer any torque at all, now prevails between the dogs of the dog clutch element 14. The latter can then be simply disengaged. The target rotational speed, and here preferably the target rotational speed in the region of the output shaft 10, which can be sensed by the rotational speed sensor 16, can now be set in turn via the electric machine 4. For this purpose, in turn, for example in the motor mode of the electric machine 4, the internal combustion engine 3 is accelerated or, in the generator mode thereof is braked. This ultimately leads to the desired target rotational speed of the output shaft 10. At said target rotational speed, the dog clutch element 14 or the two dogs thereof is then engaged again, which in turn can take place in a load-free manner without a significant difference in rotational speed, and therefore overall an extremely rapid and efficient shifting is possible. As is also customary in previous dog clutch elements, the dog clutch element 14 can have mechanical synchronization devices which permit engagement even when there are already differences in rotational speed. However, by means of the described method, said differences in rotational speed can be significantly minimized, and therefore the engagement is possible in an extremely rapid and efficient manner. In particular, friction losses are minimized, which leads to improved utilization of energy, on the one hand, and to reduced wear, on the other hand.

The dog clutch element 14 can therefore be used in all operating situations of the transmission system and therefore of the hybrid vehicle 2, which constitutes a decisive advantage over the conventional use. The use takes place here extremely rapidly and efficiently, and therefore a very rapid and use-optimized shifting is possible. Furthermore, the driving comfort is increased by means of the shortened shifting time.

The invention claimed is:

1. A method for performing shifts in a dog clutch element of a transmission system of a hybrid vehicle, the hybrid vehicle having driven wheels, an internal combustion engine with a crankshaft, an input shaft connected to the crankshaft, an output shaft connected at least indirectly to the driven wheels, an electric machine being in engagement with the input shaft, and an automatic transmission or a transmission which is shiftable in an automated manner between the input shaft and the output shaft, the transmission having the dog clutch element for a releasable coupling of two transmission elements, which comprises the steps of:

during a desired shifting of the dog clutch element, a torque of the input shaft is adapted via the electric machine, and therefore a reduced load prevails in a region of the dog clutch element and the dog clutch element is disengaged;

subsequently braking or accelerating the internal combustion engine to a desired target rotational speed via the electric machine; and subsequently engaging the dog clutch element when or shortly before the desired target rotational speed is reached.

2. The method according to claim 1, which further comprises controlling/regulating a shifting operation of the dog clutch element via at least one control unit for the transmission and the electric machine and integrated in the transmission system.

3. The method according to claim 1, which further comprises reducing the load on the dog clutch element to zero before disengagement.

4. The method according to claim 1, which further comprises determining the desired target rotational speed at the output shaft.

5. The method according to claim 1, which further comprises providing each of the input shaft and the output shaft with one rotational speed sensor, wherein the rotational speed sensor supplies a sensed rotational speed to a control unit integrated in the transmission system.

6. The method according to claim 1, which further comprises disposing an inclination sensor in the transmission system, the inclination sensor supplying its sensed data to a control unit integrated in the transmission system.

7. The method according to claim 1, wherein the transmission used is a differential converter transmission having an overdrive, and a change in a transmission ratio of the transmission is switched on via the dog clutch element.

8. The method according to claim 1, which further comprises using a gas engine as the internal combustion engine in the hybrid vehicle.

9. The method according to claim 1, wherein the input shaft is connected directly or via a torsional vibration damper to the crankshaft of the internal combustion engine.

* * * * *